United States Patent
Willis et al.

(10) Patent No.: US 9,124,909 B1
(45) Date of Patent: *Sep. 1, 2015

(54) METADATA FOR COMPRESSED VIDEO STREAMS

(71) Applicant: THE BOEING COMPANY, Chicago, IL (US)

(72) Inventors: Raymond W. Willis, Seattle, WA (US); Jeffrey A Heim, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,023

(22) Filed: Feb. 4, 2015

Related U.S. Application Data (63) Continuation of application No. 14/018,253, filed on Sep. 4, 2013, now Pat. No. 8,973,075.

(51) Int. Cl.
| | |
|---|---|
| *H04N 7/173* | (2011.01) |
| *H04N 21/235* | (2011.01) |
| *H04N 21/236* | (2011.01) |
| *H04N 21/643* | (2011.01) |
| *H04N 21/85* | (2011.01) |
| *H04N 21/84* | (2011.01) |

(52) U.S. Cl.
CPC ..... *H04N 21/2353* (2013.01); *H04N 21/23605* (2013.01); *H04N 21/64322* (2013.01); *H04N 21/84* (2013.01); *H04N 21/85* (2013.01)

(58) Field of Classification Search
USPC ........... 725/116, 109, 118, 134, 141, 153, 98, 725/93, 76, 75, 54, 44, 25, 31; 348/14.13, 348/397.1, 398.1, 439.1, 564, 568, 700, 348/719; 375/240.8, 240.12, 240.25, 375/240.26, 240.28

See application file for complete search history.

(56) References Cited

U.S. PATENT DOCUMENTS

| | | | |
|---|---|---|---|
| 6,357,042 B2 | 3/2002 | Srinivasan et al. | |
| 2002/0172281 A1* | 11/2002 | Mantchala et al. | 375/240.12 |
| 2003/0056212 A1* | 3/2003 | Siegel et al. | 725/31 |
| 2009/0290645 A1* | 11/2009 | Mabey | 375/240.25 |

(Continued)

FOREIGN PATENT DOCUMENTS

| | | |
|---|---|---|
| WO | 2011008660 A1 | 1/2011 |
| WO | 2013100986 A1 | 7/2013 |

OTHER PUBLICATIONS

"MPEG transport stream" MPEG transport stream—Wikipedia, the free encyclopedia downloaded on Jul. 8, 2013 en.wikipedia.org/wiki/MPEG-TS.

(Continued)

*Primary Examiner* — Jefferey Harold
*Assistant Examiner* — Mustafizur Rahman
(74) *Attorney, Agent, or Firm* — Duft Bornsen & Fettig LLP (57) ABSTRACT

Systems and methods are provided for adding or extracting metadata for video streams. The system receives a video stream compressed according to a video encoding standard, and generates a packet for transmission across a packet-switched network. The system inserts at least one compressed segment of the video stream into a payload of the packet. The system also receives metadata that describes content within the video stream and is not compressed according to the standard, inserts the metadata into the packet without compressing the metadata according to the standard, and transmits the packet across the packet-switched network to a target device.

26 Claims, 9 Drawing Sheets

(56) References Cited

U.S. PATENT DOCUMENTS

| | | | | |
|---|---|---|---|---|
| 2011/0007150 | A1* | 1/2011 | Johnson et al. | 348/135 |
| 2011/0007962 | A1* | 1/2011 | Johnson et al. | 382/154 |
| 2011/0115977 | A1* | 5/2011 | Simpson et al. | 348/564 |
| 2011/0175999 | A1* | 7/2011 | McCormack | 348/143 |
| 2011/0176542 | A1* | 7/2011 | Biswas et al. | 370/389 |
| 2011/0283203 | A1* | 11/2011 | Periyannan et al. | 715/753 |
| 2012/0082226 | A1* | 4/2012 | Weber | 375/240.12 |
| 2012/0159534 | A1* | 6/2012 | Quan et al. | 725/31 |
| 2013/0047189 | A1* | 2/2013 | Raveendran et al. | 725/81 |
| 2013/0283173 | A1* | 10/2013 | Harper et al. | 715/734 |

OTHER PUBLICATIONS

"MPEG-2 Transport Stream Explained," MPEG-2 Transport Stream Explained—Lost Code downloaded on Jul. 8, 2013 lostcode.wikidot.com/transportstream.

Gilmer, Brad ; "Network protocols—As broadcasters build more IT-based facilities, certain core protocols are emerging as critical," Network protocols | Production content from Broadcast Engineering downloaded on Jul. 8, 2013 broadcastengineering.com/production/network-protocols.

"Real Time Streaming Protocol," Real Time Streaming Protocol—Wikipedia, the free encyclopedia downloaded Jul. 8, 2013 en.wikipedia.org/wiki/RTSP.

"Real-time Transport Protocol," Real-time Transport Protocol—Wikipedia, the free encyclopedia downloaded on Jul. 8, 2013 en.wikipedia.org/wiki/Real-time_Transport_Protocol.

Alex MacAulay, Boris Felts, Yuval Fisher;"Whitepaper—IP Streaming of MPEG-4: Native RTP vs MPEG-2 Transport Stream," Copyright © 2005, Envivio, Inc.

U.S. Appl. No. 13/752,811 filed by others.

* cited by examiner

TARGET SIDE CORRELATION OF METADATA WITH VIDEO CONTENT

FIG. 9

METADATA FOR COMPRESSED VIDEO STREAMS

FIELD

The invention relates to the field of streaming video, and in particular, to information used to describe content within streaming video.

BACKGROUND

In packet-switched networks such as Internet Protocol (IP) networks (e.g., the Internet), videos are sent between network devices as streams of digital packets of information. Because videos take up a great deal of bandwidth when they are being streamed across the network, the data for a video is typically compressed before it is placed inside of a digital packet. For example, a codec can be used to compress a video in accordance with a defined encoding standard before transmitting the video across the network. One example of a codec used to compress videos is the Moving Picture Experts Group 2 Transport Stream (MPEG-TS) codec. When MPEG-TS compression is used, a video is split up into many individual segments of compressed MPEG-TS video data that form a video stream. The MPEG-TS segments are inserted into IP packets, which are then sent out along the network towards one or more target devices. An IP packet is an example of a "network layer" packet, while an MPEG-TS segment is used as input for a "transport layer."

Some codecs allow a user to insert additional information known as metadata into a video. For example, metadata can describe a name for the video, a resolution for the video, and other information. As presently practiced, metadata and video data are combined together when a video is initially encoded/compressed. Thus, both types of information are compressed by a codec into a single video stream before they are transmitted along a network. When the video stream is later decompressed at a destination device, the video data and the metadata can be viewed by an end user. For example, when MPEG-TS encoding is used, individual compressed MPEG-TS segments can each describe video data or metadata.

By compressing video data and metadata together, codecs help to reduce the overall bandwidth of a video stream. However, they also make the metadata inaccessible to devices that do not have access to the codec.

SUMMARY

Embodiments described herein insert metadata into packets (e.g., IP packets) that are used to carry streams of encoded video data (e.g., video data that is MPEG-TS encoded) across a packet-switched network. The metadata is in a different format from the encoded video data because the metadata has not been compressed by the codec used for the video data. In effect, the metadata is placed within the packet without also being inserted into the compressed video stream. Since this technique does not require the use of a codec to insert or retrieve metadata for a video stream, the technique is codec independent. Therefore, this technique allows metadata to be added to any video stream regardless of the compression algorithm used for that stream.

One embodiment is a system that inserts metadata for a video stream. The system includes a controller that receives a video stream compressed according to a video encoding standard, and generates a packet for transmission across a packet-switched network. The controller inserts at least one compressed segment of the video stream into a payload of the packet. The controller also receives metadata that describes content within the video stream and is not compressed according to the standard, inserts the metadata into the packet without compressing the metadata according to the standard, and transmits the packet across the packet-switched network to a target device.

Another embodiment is a method for inserting metadata for a video stream. The method includes receiving a video stream compressed according to a video encoding standard, generating a packet for transmission across a packet-switched network, and inserting at least one compressed segment of the video stream into a payload of the packet. The method also includes receiving metadata that describes content within the video stream and is not compressed according to the standard, inserting the metadata into the packet without compressing the metadata according to the standard, and transmitting the packet across the packet-switched network to a target device.

Another embodiment is a method for extracting metadata for a video stream. The method includes receiving packets from a packet-switched network, and extracting at least one segment of video data from each packet. The segments are compressed according to a video encoding standard. The method also includes extracting metadata from each packet. The metadata describes content within the video data and is not compressed according to the standard. Also, the method includes assembling the segments of the video data into video frames, displaying the video frames via a presentation device, and displaying the metadata via a presentation device.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
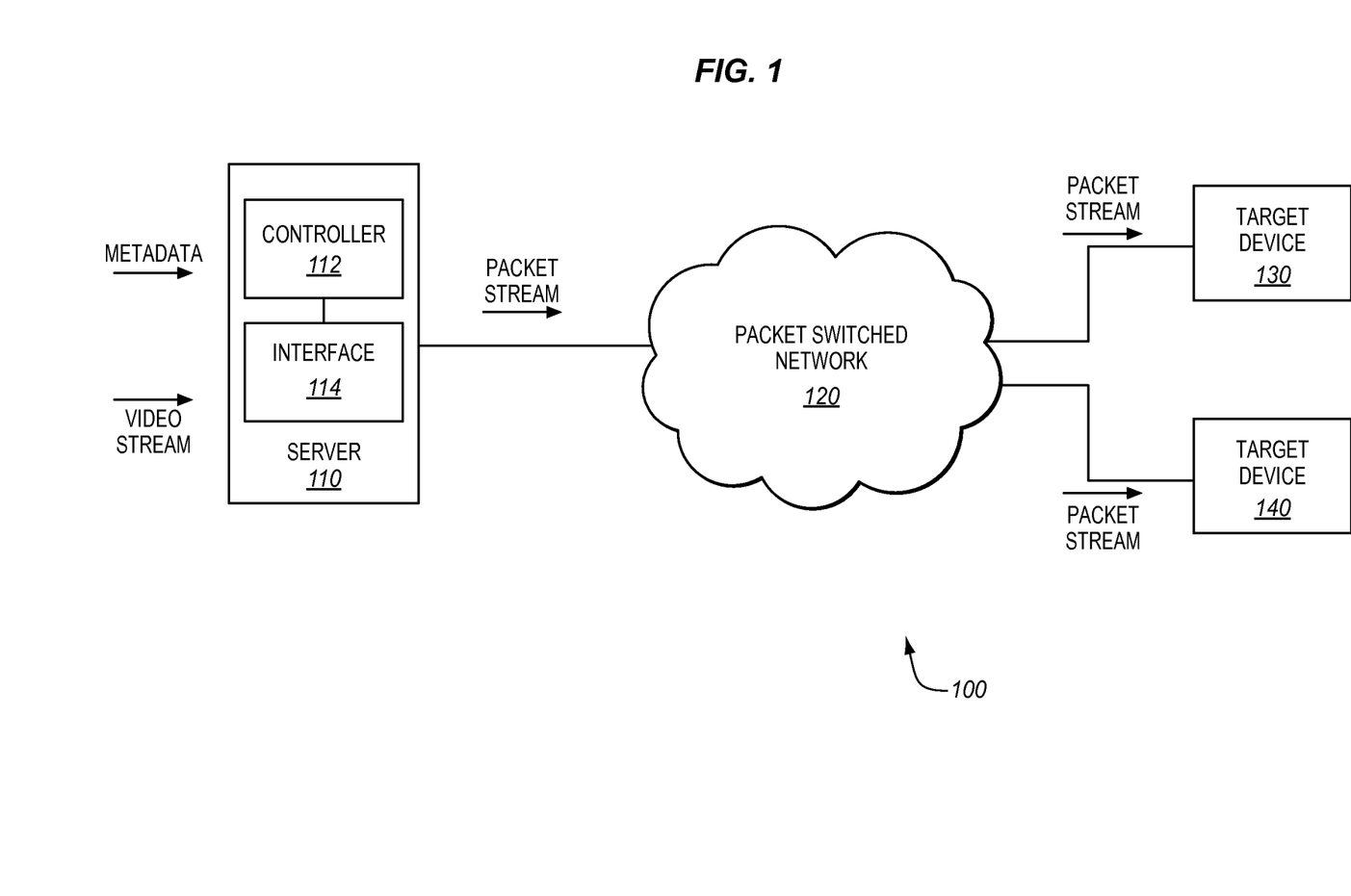
FIG. 1 is a block diagram of a communication system in an exemplary embodiment.

FIG. 1 is a block diagram of a communication system 100 in an exemplary embodiment. Server 110 of communication system 100 receives streams of video from a source such as a camera or other recording device. The video streams are intended for transmission across packet-switched network 120 to one or more target devices. These video streams may be compressed in order to limit the amount of bandwidth that they occupy while being transported across network 120.

In order to transport a video stream across packet-switched network 120, server 110 encapsulates the video into packets of data suitable for network 120 (e.g., IP packets), and transmits the packetized stream of video across network 120 for viewing at one or more target devices.

Server 110 includes a controller 112 that has been enhanced to receive and insert (or extract) metadata for compressed video streams. The metadata is inserted without using the same compression standard that is used for the video stream. Server 110 can insert any type of metadata into the packets for network 120, even types of metadata that are not supported by the video encoding standard. Furthermore, the insertion process does not require server 110 to reprocess the video stream with a codec. The packets that have been generated by controller 112 may be transmitted by interface 114 across network 120 towards target devices 130 and/or 140. Controller 112 comprises any suitable system, device, or component capable of generating/manipulating packets of data, such as hardware circuitry or a processor executing stored instructions. Interface 114 may comprise any suitable system for transmitting data between devices. For example, interface 114 may comprise an Ethernet port or wireless transceiver.

Packet-switched network 120, which bears data for the video stream as the video stream travels from server 110 to target devices 130 and/or 140, comprises any suitable communication network capable of transporting data from server 110. For example, network 120 may comprise a Transport Control Protocol/Internet Protocol (TCP/IP) network. Target devices 130 and 140 comprise any suitable systems or components operable to receive and/or display video content. For example, target devices may comprise general purpose computers, cellular phones, laptops, tablets, etc.

The particular arrangement, number, and configuration of components described herein is exemplary and non-limiting. Illustrative details of the operation of communication system 100 will be discussed with regard to FIG. 2. Assume, for this embodiment, that server 110 is awaiting a stream of video data to relay to one or more target devices.

Figure 2:
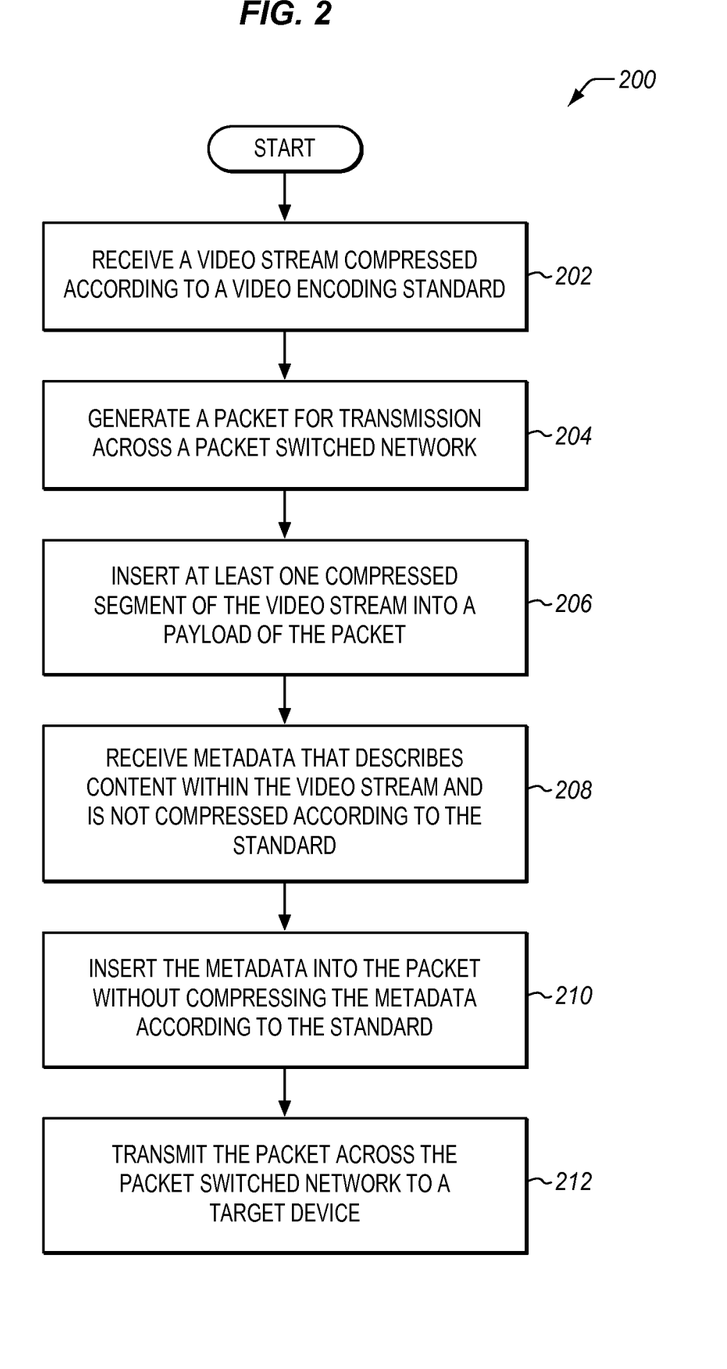
FIG. 2 is a flowchart illustrating a method for adding metadata for a video stream in an exemplary embodiment.

FIG. 2 is a flowchart illustrating a method 200 for adding metadata for a video stream in an exemplary embodiment. The steps of method 200 are described with reference to communication system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 of server 110 receives a video stream compressed according to a video encoding standard. The video stream includes segments of video data, such as packets of video data, entire video frames, etc. The video stream may be compressed according to any suitable video encoding standard (e.g., MPEG-TS, H.264/MPEG-4 Advanced Video Coding, etc.). In terms of the Open Systems Interconnection (OSI) model, various video encoding standards may be regarded as inputs to transport layer protocols, to session layer protocols, or to application layer protocols.

In step 204, controller 112 generates a packet for transmission across packet-switched network 120. The packet may comprise, for example, an Internet Protocol (IP) packet that includes a header (which stores control information for the packet) as well as a payload (which carries data intended for delivery). In one embodiment, the packet is a network-layer packet such as an Internet Protocol (IP) packet, which encapsulates one or more compressed MPEG-TS packets of video data. Network-layer packets are distinct from application-layer, session-layer, and transport-layer packets used for video encoding (such as MPEG-TS packets) because network-layer packets direct packet forwarding between devices (e.g., routing), while packets in other layers do not. Controller 112 inserts one or more compressed segments of the video stream into the payload of the generated packet in step 206. This means that the segments of the video stream are placed into the packet in a location apart from the header of the packet.

In this embodiment, assume that metadata has been generated for the video stream, and that the metadata is being transmitted to server 110 at the same time as the video stream is being transmitted to server 110. In step 208, controller 112 receives the metadata. The metadata describes content within the video stream. The metadata may describe the content by indicating the circumstances in which the video stream was recorded, or may describe the content by detailing specific features of individual frames or packets of video data. The metadata, as received, is not compressed according to the video encoding standard. In one embodiment, the metadata comprises a stream of telemetry data points, such as a series of Global Positioning System (GPS) coordinates that indicate where frames of video from a moving aircraft were recorded. Similarly, the telemetry data may describe how the yaw, pitch, and roll of an aircraft that recorded the video changed over time, or other flight dynamics information.

In step 210, controller 112 inserts the metadata into the packet without compressing the metadata according to the video encoding standard. Since the metadata in the packet is not compressed according to the video encoding standard, the metadata exists independently from the video data within the packet and does not require a codec to be inserted or removed from the video stream. The metadata may be formatted according to any suitable standard.

In one embodiment, information describing the metadata is inserted into a header of the packet. As used herein, the "header" of a packet is an inclusive term used to describe any control information for the packet, and therefore includes footers that place control information at the end of a packet. A header of a packet is distinct from a payload of a packet.

In step 212, controller 112 operates interface 114 to transmit the packet out across packet-switched network 120 to one or more target devices (e.g., target devices 130 and/or 140). Steps 204-212 may be repeated continuously while the video stream is being received at server 110, in order to generate and transmit a series of packets that carry the video stream to the target devices. For example, interface 114 may transmit the multiple video frames of data in a stream of IP packets that each encapsulate video data and metadata.

When the packets are later unwrapped by a target device, the metadata (e.g., a GPS coordinate) for each packet can be correlated with video data included in the same packet, and thereby linked to specific video frames. Since the packets are sent out across the network as coherent units of metadata and video data, their time-coherency is maintained when they are received and re-assembled.

Using method 200 described above, metadata can be added to video streams in a manner that links the metadata to specific packets/frames of video data. Thus, even when the metadata comprises a stream of data points that constantly change throughout the duration of a video (such as telemetry data), the metadata can be correlated with specific frames of video data, allowing for detailed tagging of video content.

In a further embodiment, controller 112 operates to temporally correlate segments of the video stream with the metadata, and to package video segments and correlated metadata into the same packets. This may be desirable when the metadata itself comprises a stream of data points that vary over time. Temporally correlating metadata with segments of the video stream may involve determining which segments (or entire video frames) of video data correspond with each data point. In one embodiment, the correlation is made based on the time at which the data points and/or video data were received or generated. For example, a newly received data point (e.g., a single GPS coordinate) may be associated with each received packet of video data until a new data point replaces the current one. In one embodiment, a master clock, or clocking mechanism such as a time and/or date stamp, provides a time for one or more metadata streams and the video stream. The clocking mechanism can correlate the one or more metadata streams with the video stream. In a further embodiment, a time of receipt is determined for each data point, and the data points are correlated with segments of video data that were received at substantially the same time. This technique provides a benefit over the metadata fields defined for most video compression standards, which do not allow metadata for a video stream to vary over time.

In a further embodiment, the metadata may be received at server 110 at different intervals than the video stream itself, and may be received from an entirely separate source or using an entirely different communication protocol than the one used for the video stream. For example, the video stream may be received at server 110 as a stream of MPEG-TS packets received via Real-time Transport Protocol (RTP) or User Datagram Protocol (UDP) at a rate of twenty frames per second, while the metadata may be received once per second via a radio communication protocol.

In a further embodiment, when the metadata is initially received in step 208, the metadata may include multiple types of information from one or more independent sources, and each type of information in the metadata may describe a different unique aspect of the video stream. For example, one type of metadata may describe the yaw, pitch, and roll of the vehicle that recorded the video stream, while another type of metadata may describe the speed of the vehicle. The multiple types of metadata may be inserted into each packet using the techniques discussed above. To distinguish different types of metadata from each other within a single packet, the packet may include a header with information that describes the many different types of metadata that the packet encapsulates.

Figure 3:
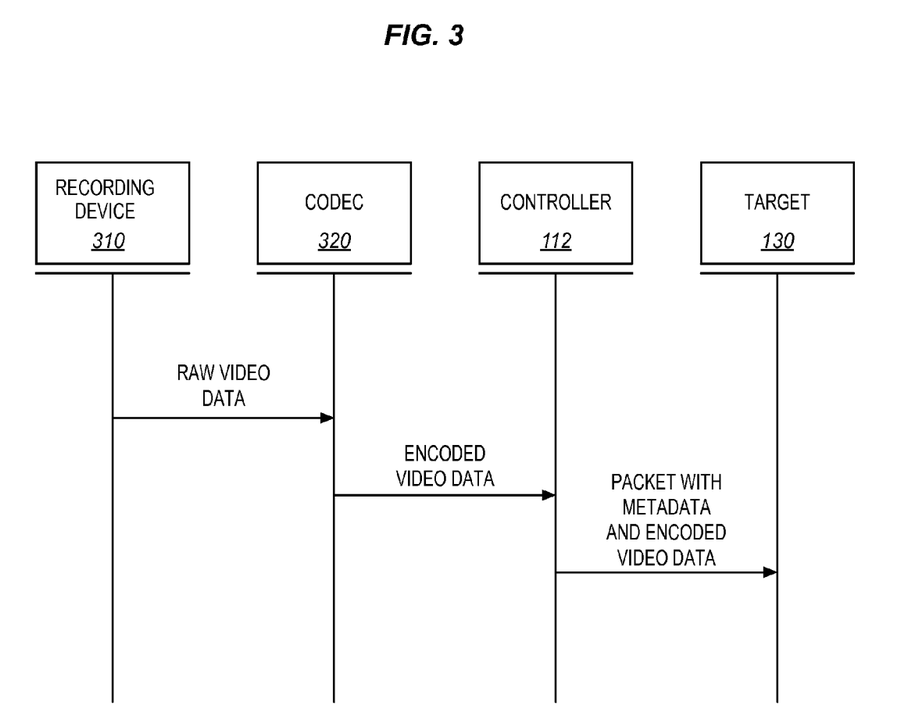
FIG. 3 is a message diagram illustrating how video data is processed as the video data travels through a communication system in an exemplary embodiment.

FIG. 3 is a message diagram illustrating how video data is processed as the video data travels through a communication system in an exemplary embodiment. According to FIG. 3, raw video data is first acquired by a recording device 310, and is then provided to a codec 320. Codec 320 may reside at recording device 310 or at server 110, or even some intermediate device between them. Codec 320 encodes the video data to reduce its overall size and prepare the video for transport, and this compressed video data is transmitted to controller 112 of server 110. Server 110 inserts the metadata and compressed video data into packets, and sends these packets outward, delivering the stream to target 130 via network 120.

Figure 4:
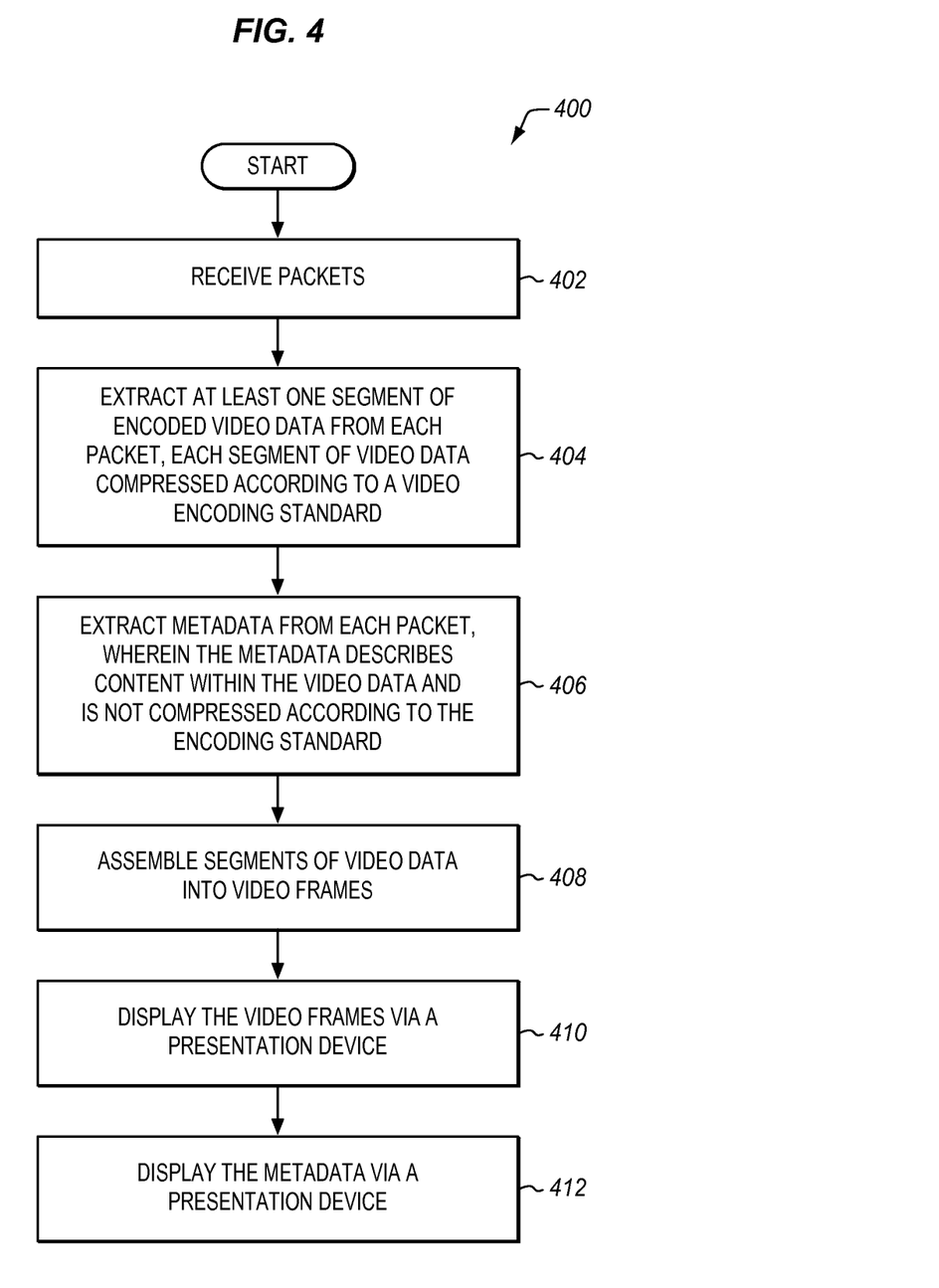
FIG. 4 is a flowchart illustrating a method for extracting metadata for a video stream in an exemplary embodiment.

After the packets assembled and transmitted in method 200 have traveled across packet-switched network 120 to target device 130, they are processed by target device 130 for viewing. FIG. 4 is a flowchart illustrating a method 400 for extracting metadata for a video stream in an exemplary embodiment. In this embodiment in step 402 target device 130 receives the packets initially created by server 110.

Target device 130 extracts the segments of compressed video data from the payload of each packet in step 404, and also extracts the metadata from each packet in step 406. Target device 130 then operates a codec to decode the segments of video data, and assembles the video data into a series of video frames that can be viewed in step 408. The video frames and metadata may then be displayed via one or more presentation devices, in steps 410-412.

In a further embodiment, target device 130 further correlates specific metadata data points (e.g., GPS coordinates) with specific frames of the assembled video. Target device 130 achieves this goal by identifying which network-layer packets were used to assemble each video frame.

Data points from the network-layer packets can then be correlated with their appropriate frames, and the data points and video stream can be presented together via a presentation device such as a monitor, screen, projector, etc. for viewing by a user. For example, in an embodiment where the data points comprise a series of GPS coordinates, each frame of the video can be tagged with a GPS coordinate.

EXAMPLES

In the following examples, additional processes, systems, and methods are described in the context of an unmanned aerial drone used to spot wildfires. Assume for this embodiment that the drone is operated to traverse a large swath of land over a relatively short period of time in search of any signs of wildfires. The drone includes a video camera for recording footage, as well as a GPS receiver and a transmitter.

Figure 5:
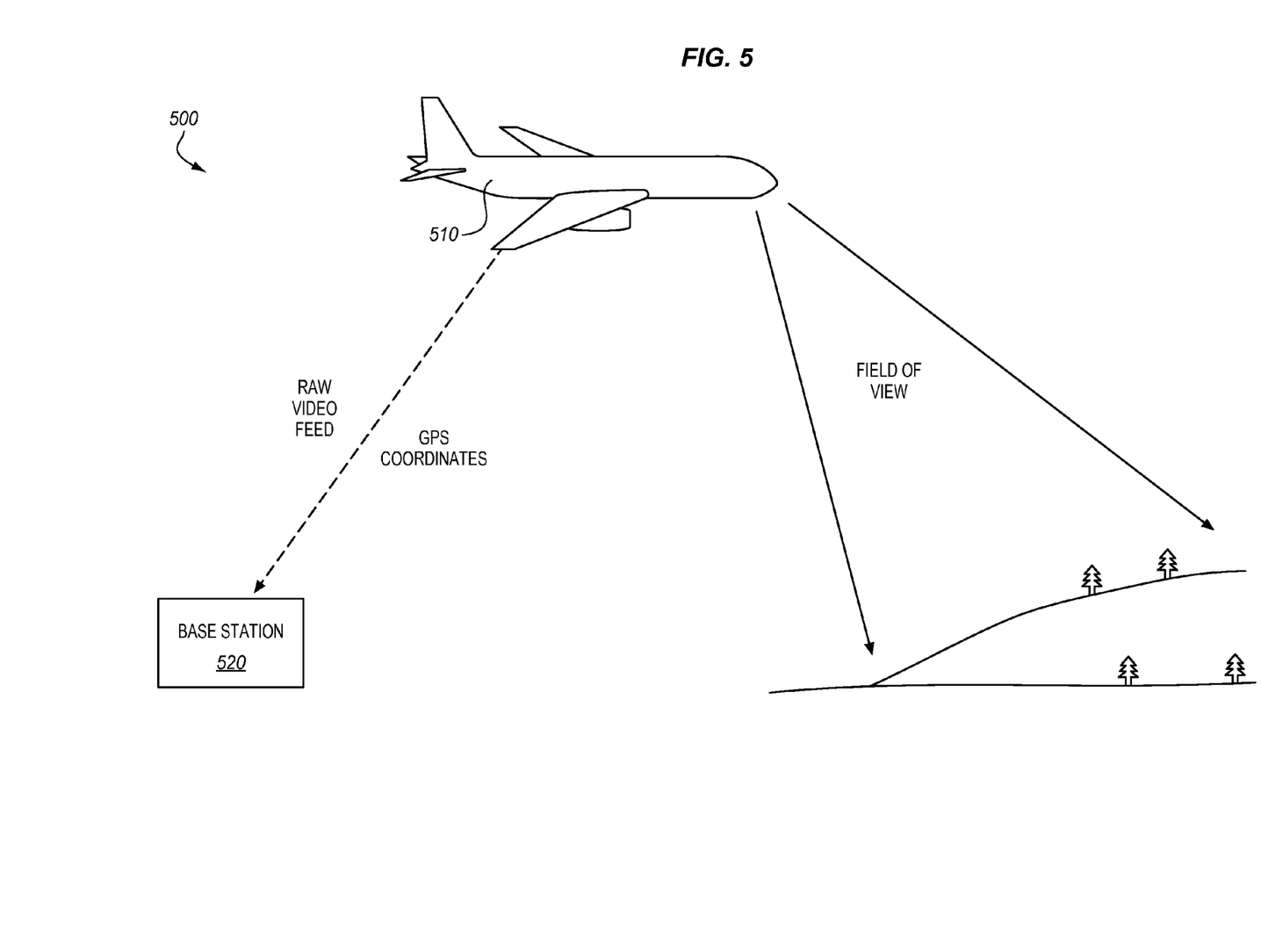
FIG. 5 is a block diagram illustrating the generation and transmission of video data at an unmanned aerial drone in an exemplary embodiment.

FIG. 5 is a block diagram 500 illustrating the generation and transmission of video data at unmanned aerial drone 510 in an exemplary embodiment. In this embodiment, the drone acquires video data, encodes the video data according to the MPEG-TS standard, and transmits the compressed stream of video data to base station 520 (or any other device capable of receiving wireless data) at a rate of eight frames per second.

Drone 510 also transmits GPS coordinates to base station 520 four times per second. Assume for this example that owing to the specific implementation of components from different vendors onboard drone 510, that drone 510 is incapable of inserting the GPS data directly into the MPEG-TS stream when the video is initially recorded and compressed. This GPS data is also received at base station 520. Additional types of metadata that vary over time can be transmitted to the base station, such as a temperature currently identified by a thermal sensor viewing the ground, a velocity of the drone, an altitude of the drone, a direction in which a video camera for the drone is pointing, the angle of deviation of a video camera for the drone from a horizontal orientation, other telemetry information for the drone, a time/date, etc.

Figure 6:
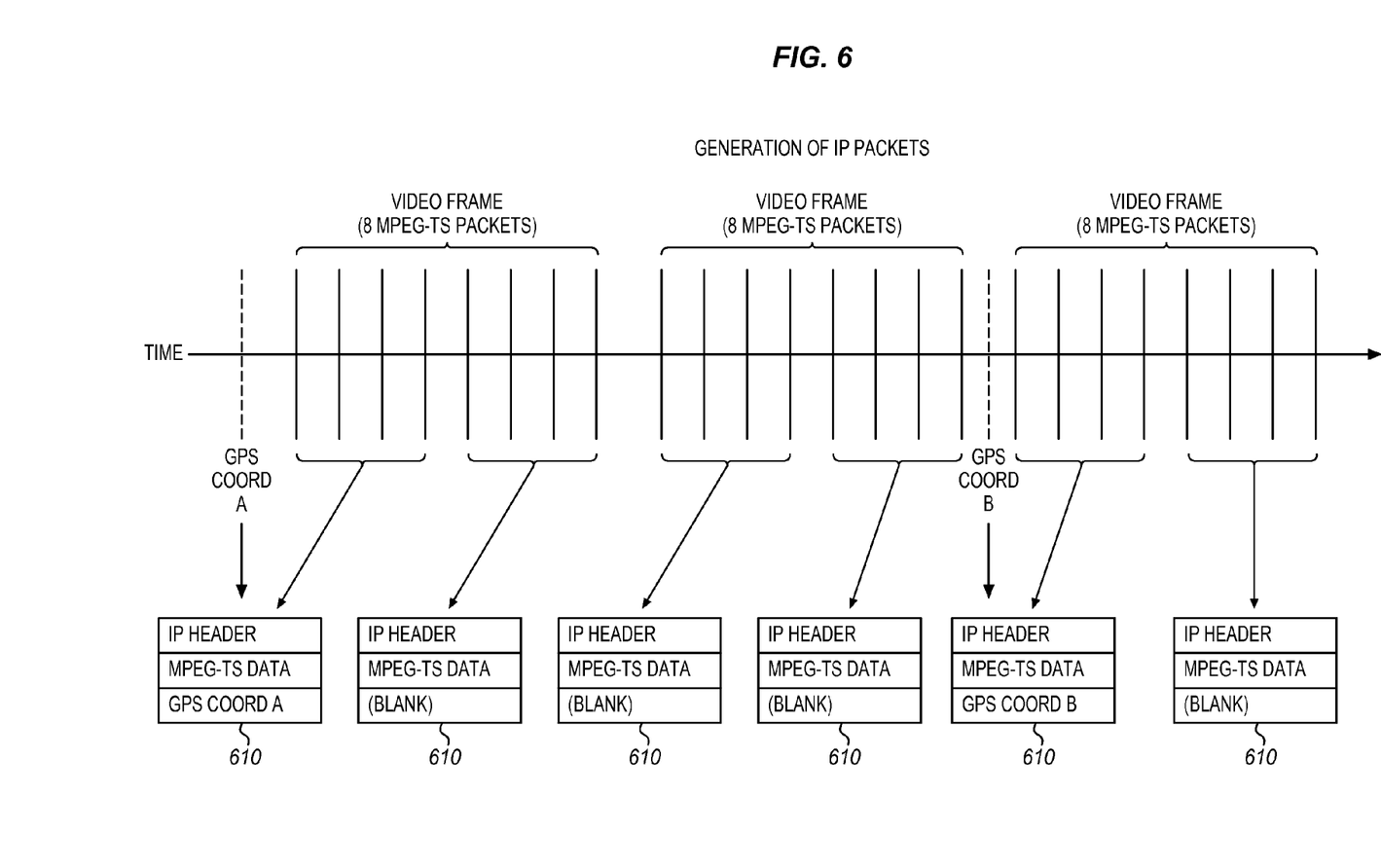
FIG. 6 is a block diagram illustrating the creation of IP packets made from multiple MPEG-TS packets in an exemplary embodiment.

FIG. 6 is a block diagram illustrating the creation of IP packets made from multiple MPEG-TS packets in an exemplary embodiment. According to FIG. 6, base station 520 correlates the received GPS coordinates with received packets of video data based on their order of receipt, and then encapsulates received MPEG-TS packets and metadata inside of an IP packet wrapper. In one embodiment, the metadata and MPEG-TS packets are encapsulated inside of an IP packet wrapper on the drone before being transmitted to the base station 520.

In this example, each frame of video data is compressed with eight MPEG-TS packets that are each 188 bytes. Four MPEG-TS packets are inserted into each IP packet. Thus, two IP packets are used to transmit each video frame. Base station 520 inserts GPS coordinates into newly created IP packets as the GPS coordinates are received. Each GPS coordinate (and any other metadata) is placed after the MPEG-TS data within the IP packet. In this example, GPS coordinate "A" is inserted into an IP packet, then the metadata portions of new IP packets are left blank until GPS coordinate "B" is received. If multiple GPS coordinates are received for a single video frame, a target device receiving the IP packets may determine which GPS coordinate to associate with the video frame. For example, the target device may associate the most recent GPS coordinate with the video frame.

In this example, each IP packet includes an IP routing header, a variable-length amount of video data, a variable amount of metadata, and a 34 byte footer. The footer is used to identify the number of streams of metadata included in the packet, a description for each stream of metadata, and the size of each stream of metadata. In one embodiment, the footer indicates that three different streams of metadata are included in the packet, each stream occupying a different amount of space within the packet.

In this example, the footer includes a 16 byte video stream identifier, which uniquely identifies the video stream from others that may also be currently carried on the same network. The footer also includes a 1 byte indicator of the number of metadata streams include in the packet, as well as a 4 byte indicator of the amount of raw video in the packet. The footer further includes a 2 byte sequence number, which is used to sequence the IP packets and ensure that they can be re-assembled in the correct order. Another element of the footer is an 8 byte time stamp, and a 1 byte packet version, which is used to indicate a format used to store the metadata. The footer also includes a 2 byte identifier, which is used to indicate whether an IP packet starts a new video frame.

In this example, the metadata within each IP packet is broken up into sections. Each section of metadata inside of the IP packet corresponds to a specific type of metadata. Each section of metadata includes its own 4 byte header indicating the amount of metadata included in the section, followed by the metadata content itself (e.g., a specific GPS coordinate, a velocity, an altitude, other flight dynamics data points, etc.).

Figure 7:
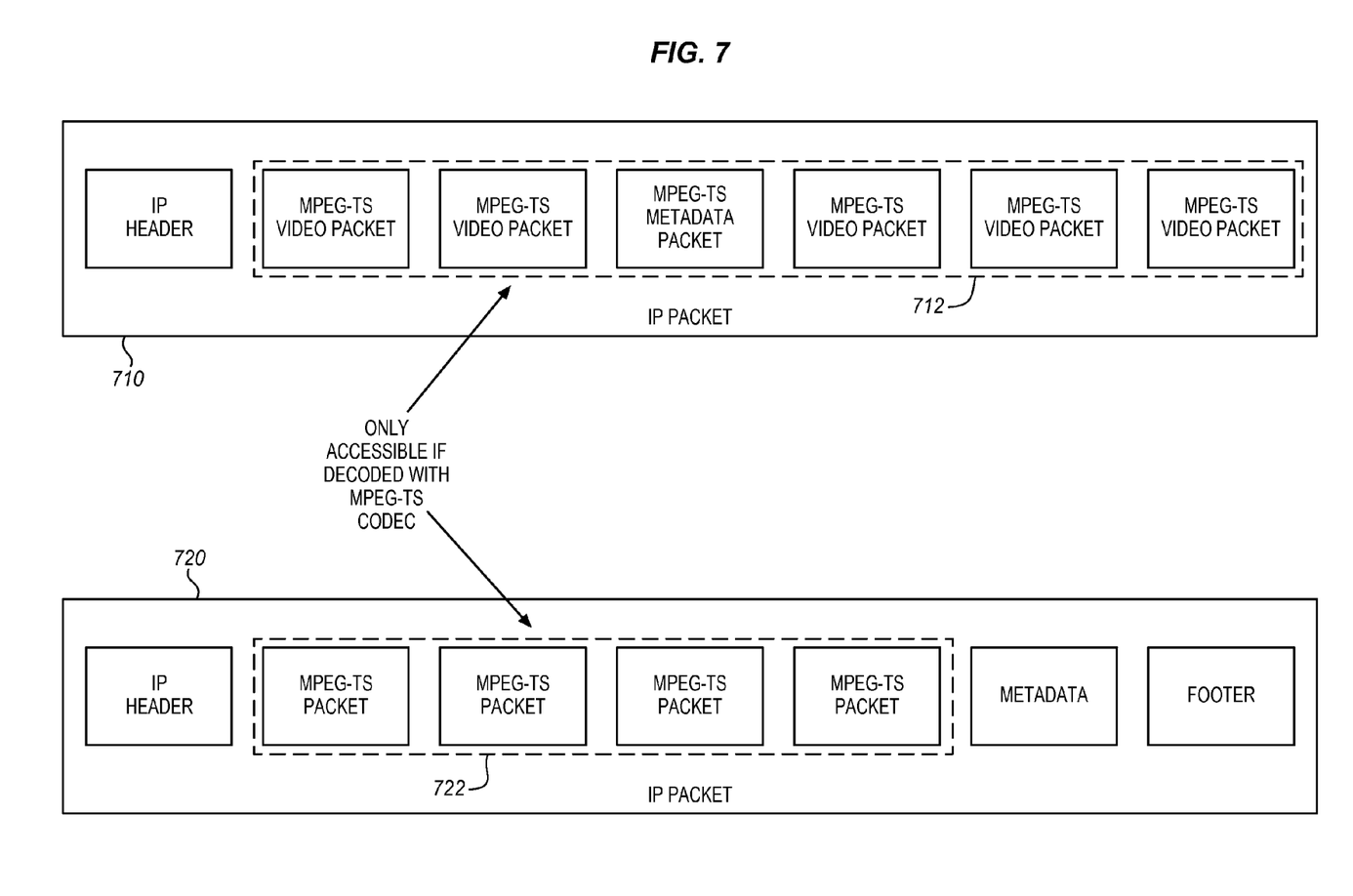
FIG. 7 is a block diagram comparing MPEG-TS encoded metadata within an IP packet to metadata that is not MPEG-TS encoded within an IP packet in an exemplary embodiment.

These IP packets of blended metadata and video content are then sent out across an IP network to one or more computers. Since the IP packets are sent out across the network as coherent units of metadata and video data, their time-coherency is maintained when they are received and re-assembled. Additionally, since the metadata is not compressed with a codec, a codec is not required to extract or review the metadata. FIG. 7 further illustrates this concept.

FIG. 7 is a block diagram comparing MPEG-TS compressed metadata within an IP packet to metadata that is not MPEG-TS compressed within an IP packet in an exemplary embodiment. According to FIG. 7, each IP packet includes an IP header used for routing, as well as a combination of metadata and video data. Metadata inside of the MPEG-TS compressed portion 712 of IP packet 710 is inaccessible without the MPEG-TS codec. In contrast, metadata for IP packet 720 is kept outside of the compressed portion 722, and therefore is accessible even without the MPEG-TS codec. Furthermore, this style of metadata encoding can be used to add metadata to any suitable video encoding format, and therefore is not codec dependent.

Figure 8:
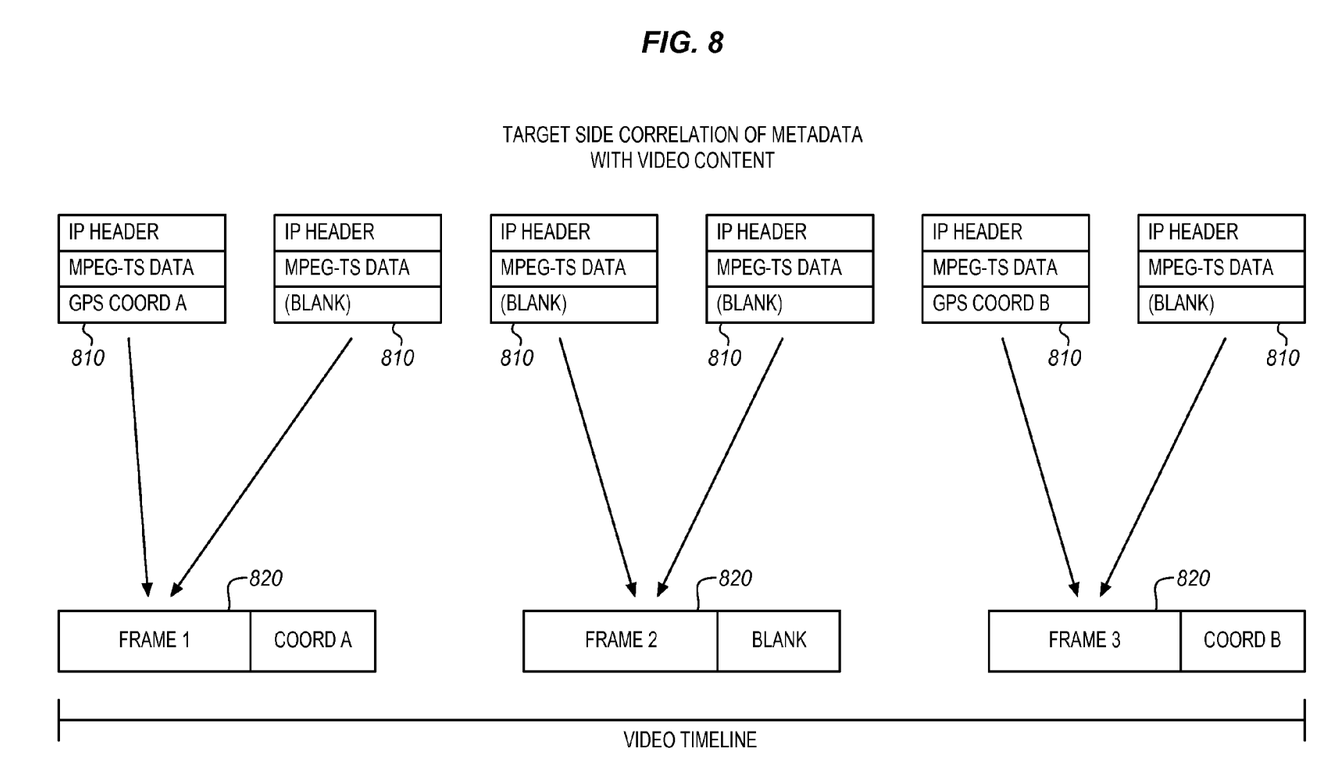
FIG. 8 is a block diagram illustrating a time-based correlation between received metadata and video data within IP packets in an exemplary embodiment.

FIG. 8 is a block diagram illustrating a time-based correlation between received metadata and video data of an IP packet in an exemplary embodiment. According to FIG. 8, multiple IP packets 810 are received that each may include metadata data points. These IP packets are received and assembled into video frames 820. Each video frame may be associated with a GPS coordinate. Thus, when the video is finally displayed, the associated GPS coordinate for that frame can also be shown.

Figure 9:
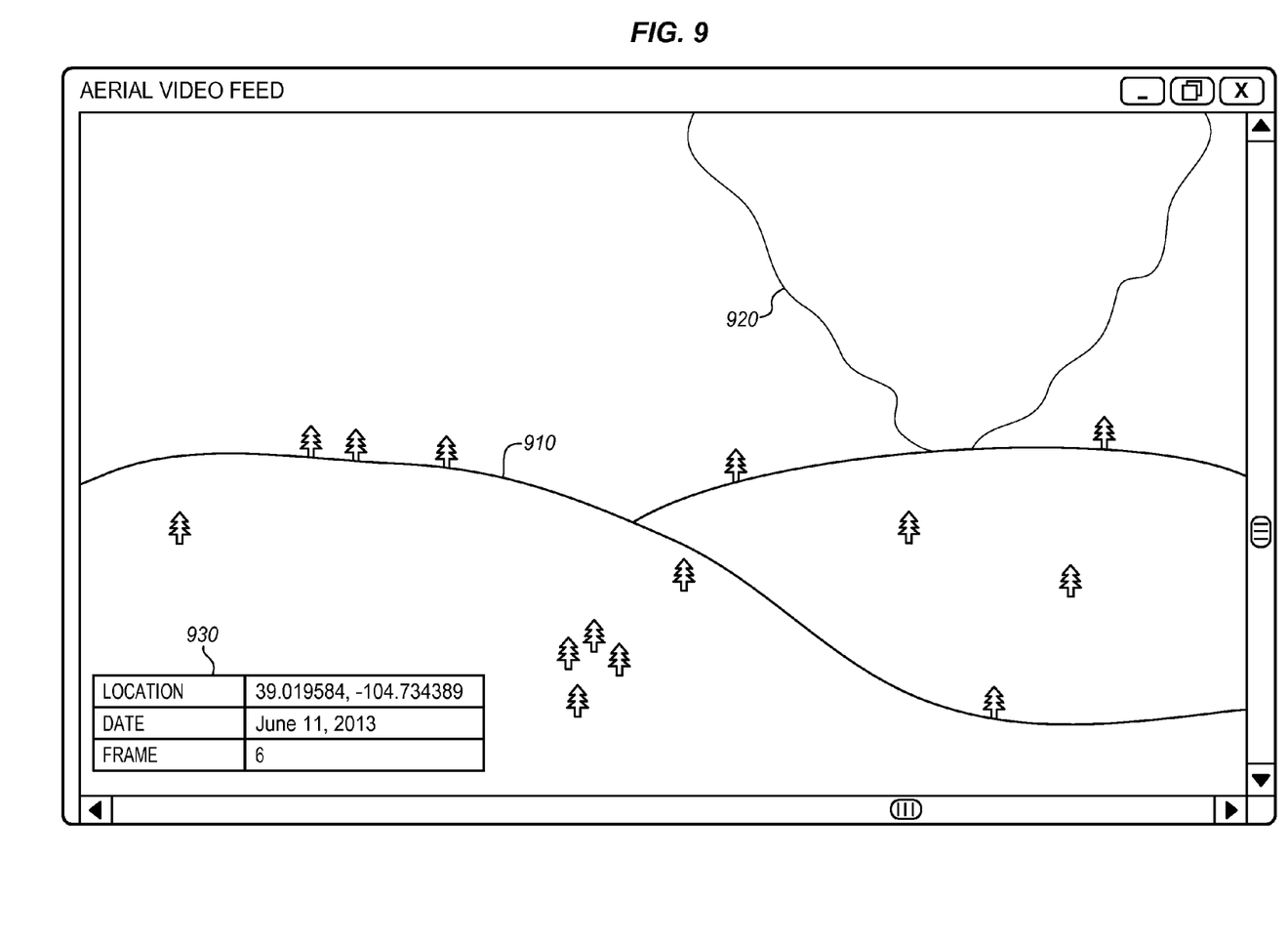
FIG. 9 illustrates a video frame and associated metadata displayed at a Graphical User Interface (GUI) in an exemplary embodiment.

FIG. 9 illustrates a video frame and associated metadata displayed at a Graphical User Interface (GUI) in an exemplary embodiment. According to FIG. 9, the video frame includes video content illustrating a section of wilderness 910 as well as a plume of smoke 920. The frame itself is accompanied by metadata 930, which is displayed in the GUI and used to indicate a date, location, and frame number for the video. Using the location data, the exact position of the detected fire can quickly be determined, increasing the speed at which firefighters can determine how to deal with the fire. As used herein, a GUI can be presented via any suitable presentation device, such as a monitor, screen, projector, etc.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

The invention claimed is:

1. A non-transitory computer readable medium embodying programmed instructions which, when executed by a processor, are operable for directing the processor to:
receive a video stream compressed according to a video encoding standard;
generate a packet for transmission across a packet-switched network;
insert at least one compressed segment of the video stream into a payload of the packet;
receive metadata that describes content within the video stream and is not compressed according to the standard, wherein the metadata comprises a series of data points received over time;
temporally correlate at least one data point with the at least one compressed segment of the video stream;
insert the metadata into the packet without compressing the metadata according to the standard, by inserting the correlated data point into the packet; and
transmit the packet across the packet-switched network to a target device.

2. The medium of claim 1, wherein:
the packet is formatted according to Internet Protocol (IP), and the network comprises an IP network.

3. The medium of claim 1, wherein:
the data points each indicate a velocity.

4. The medium of claim 1, wherein the instructions further direct the processor to:
correlate the at least one data point with the at least one segment of the video stream based on a time that the data point was received and a time that the segment was received.

5. The medium of claim 1, wherein:
the metadata comprises telemetry information that was acquired when the video stream was recorded.

6. The medium of claim 5, wherein:
the metadata comprises Global Positioning System (GPS) coordinates for the video stream that indicate locations at which the video stream was recorded.

7. The medium of claim 5, wherein:
the metadata comprises information describing the flight dynamics of a vehicle that recorded the video stream.

8. The medium of claim 1, wherein:
the video encoding standard comprises the Motion Picture Experts Group 2 Transport Stream (MPEG-TS) standard.

9. A non-transitory computer readable medium embodying programmed instructions which, when executed by a processor, are operable for directing the processor to:
receive packets from a packet-switched network;
extract at least one segment of video data from a payload of each packet, wherein the segments are compressed according to a video encoding standard;
extract metadata from each packet, wherein the metadata describes content within the video data and is not compressed according to the standard, and the metadata comprises a series of data points received over time;
temporally correlate the data points with the compressed video data based on the packets in which the compressed video data and the data points were received;
assemble the segments of the video data into video frames;
display the video frames via a presentation device; and
display the metadata via a presentation device based on the temporal correlation.

10. The medium of claim 9, wherein the instructions further direct the processor to:
identify, for each video frame, which packets included video data used to assemble the video frame;
correlate each video frame with metadata in the identified packets for the video frame; and
display each video frame synchronously with correlated metadata for the video frame.

11. The medium of claim 9, wherein:
the packet is formatted according to Internet Protocol (IP), and the network comprises an IP network.

12. The medium of claim 9, wherein:
the data points each indicate a velocity.

13. The medium of claim 9, wherein the instructions further direct the processor to:
correlate the at least one data point with the at least one segment of the video stream based on a time that the data point was received and a time that the segment was received.

14. The medium of claim 9, wherein:
the metadata comprises telemetry information that was acquired when the video stream was recorded.

15. The medium of claim 14, wherein:
the metadata comprises Global Positioning System (GPS) coordinates for the video stream that indicate locations at which the video stream was recorded.

16. The medium of claim 14, wherein:
the metadata comprises information describing the flight dynamics of a vehicle that recorded the video stream.

17. The medium of claim 9, wherein:
the video encoding standard comprises the Motion Picture Experts Group 2 Transport Stream (MPEG-TS) standard.

18. A target device comprising:
componentry operable to receive packets from a packet-switched network,
the componentry further operable to extract at least one segment of video data from a payload of each of the packets, wherein the segments are compressed according to a video encoding standard, and to extract metadata from each packet, wherein the metadata describes content within the video data and is not compressed according to the standard, and the metadata comprises a series of data points received over time,
the componentry further operable to temporally correlate the data points with the compressed video data based on the packets in which the compressed video data and the data points were received, assemble the segments of the video data into video frames, display the video frames via a presentation device, and display the metadata via a presentation device based on the temporal correlation.

19. The target device of claim 18, wherein:
the componentry is further operable to identify, for each video frame, which packets included video data used to assemble the video frame, to correlate each video frame with metadata in the identified packets for the video frame, and to display each video frame synchronously with correlated metadata for the video frame.

20. The target device of claim 18, wherein:
the packet is formatted according to Internet Protocol (IP), and the network comprises an IP network.

21. The target device of claim 18, wherein:
the data points each indicate a velocity.

22. The target device of claim 18, wherein:
the componentry is further operable to correlate the at least one data point with the at least one segment of the video stream is based on a time that the data point was received and a time that the segment was received.

23. The target device of claim 18, wherein:
the metadata comprises telemetry information that was acquired when the video stream was recorded.

24. The target device of claim 23, wherein:
the metadata comprises Global Positioning System (GPS) coordinates for the video stream that indicate locations at which the video stream was recorded.

25. The target device of claim 23, wherein:
the metadata comprises information describing the flight dynamics of a vehicle that recorded the video stream.

26. The target device of claim 18, wherein:
the video encoding standard comprises the Motion Picture Experts Group 2 Transport Stream (MPEG-TS) standard.

* * * * *